Jan. 10, 1967  D. E. RUNKLE  3,296,830
UNIVERSAL JOINT
Filed Jan. 8, 1965  2 Sheets-Sheet 1
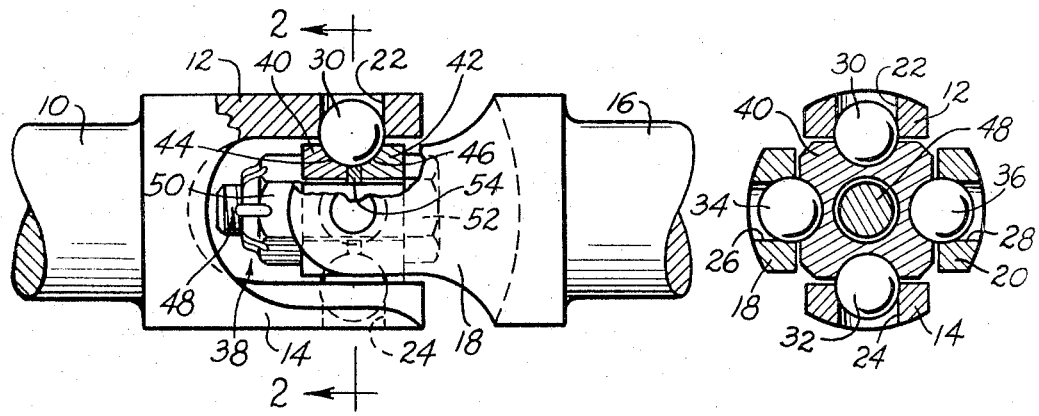
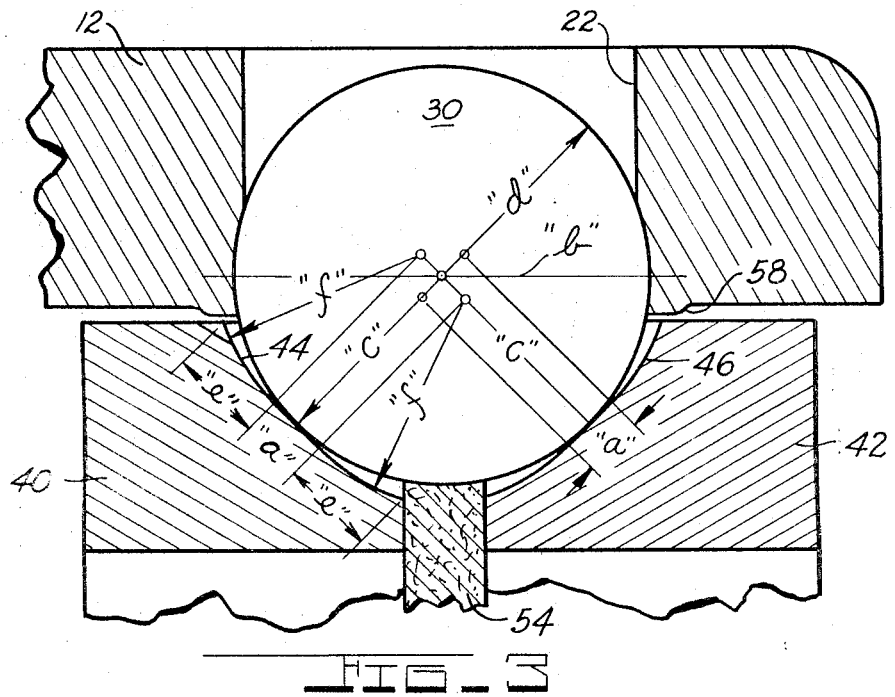
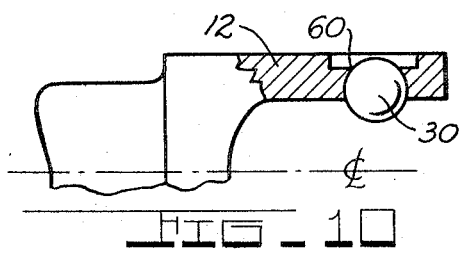
INVENTOR.
DEAN E. RUNKLE.
BY
*William N. Antonio*
ATTORNEY.

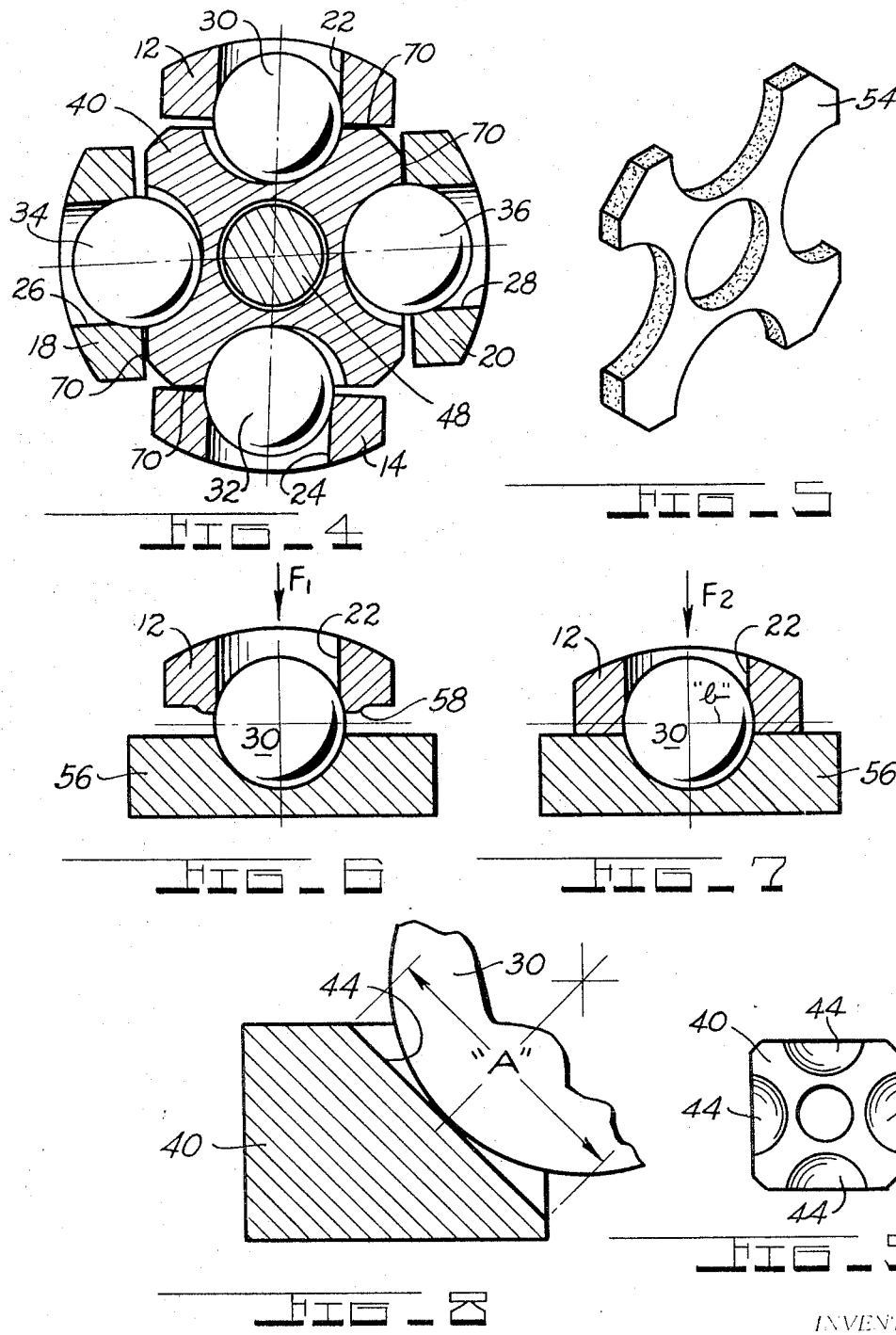

United States Patent Office 3,296,830
Patented Jan. 10, 1967

3,296,830
UNIVERSAL JOINT
Dean E. Runkle, South Bend, Ind., assignor to The Bendix Corporation, South Bend, Ind., a corporation of Delaware
Filed Jan. 8, 1965, Ser. No. 424,431
10 Claims. (Cl. 64—17)

This invention relates to universal joints and more particularly to improvements in a universal joint of the type disclosed in my copending application Serial No. 304,551, now Patent No. 3,217,516, issued November 16, 1963.

One of the objects of this invention is to provide a universal joint wherein the desired preload can be adjusted and maintained for long life and durability.

Another object of this invention is to provide a universal joint which is adjustable for precise torque requirements and insures a method whereby the preload can be matched to the application.

A further object of this invention is to provide a universal joint which is entirely free from backlash.

A still further object of this invention is to provide, in a universal joint consisting of a pair of forked members positioned at right angles with respect to each other, spherical bearing surfaces which are fixedly connected to and protrude from the arms of said forked members, said spherical bearing surfaces being received in seats formed on an adjustable torque transmitting mechanism which is utilized to join the forked members and eliminate backlash therebetween.

An important object of this invention is to provide bearing seats on the adjustable torque transmitting mechanism which include cylindrical surfaces therein, said cylindrical surfaces having a radius substantially equal to that of the spherical bearings for maintaining line contact therewith at all times to thereby assure the elimination of backlash in any direction of movement.

Another object of this invention is to provide an oil or grease soaked absorbent material within said adjustable torque transmitting mechanism for providing a source of lubricant for the universal joint.

The above and other objects, features, and advantages of the invention will become apparent from the following description taken in connection with the accompanying drawings which form a part of this invention and in which:

FIGURE 1 is a view partially in section of the universal joint;

FIGURE 2 is a sectional view taken along line 2—2 of FIGURE 1;

FIGURE 3 is a greatly enlarged sectional view of a portion of FIGURE 1;

FIGURE 4 is a sectional view similar to FIGURE 2 showing a somewhat exaggerated position of the parts during high static torque loadings;

FIGURE 5 is a perspective view of the lubricating element used in the joint;

FIGURES 6 and 7 show a method of inserting one of the spherical balls into one of the bores of the forked members and locking same therein;

FIGURE 8 is a sectional view similar to FIGURE 3 showing a modified bearing seat shape;

FIGURE 9 is a plan view of one of the components of the coupling mechanism; and

FIGURE 10 shows another method of inserting and locking one of the balls into one of the bores;

Referring to FIGURES 1–3, it will be noted that numeral 10 indicates a forked shaft member having a pair of arms 12 and 14 located at one end thereof, and that numeral 16 indicates a second similar forked shaft member having a pair of arms 18 and 20 also located at one end thereof. Diametrically opposed bores 22 and 24 are located in arms 12 and 14, respectively, whereas diametrically opposed bores 26 and 28 are located in arms 18 and 20. It will be noted that the bores 22 and 24 of the one forked shaft are centered in the same plane with the bores 26 and 28 of the other forked shaft, but are located at right angles with respect thereto. Spherical balls 30, 32, 34 and 36 are press-fit into and locked within the bores 22, 24, 26 and 28, respectively, as hereinafter described.

The adjustable coupling mechanism, indicated generally by the numeral 38, includes a pair of axially aligned square shaped torque transmitting washer-like elements 40 and 42 having portions 44 and 46, respectively, of the inner ball seats formed on the adjacent edges thereof, as shown in FIGURES 1, 3 and 9. A cylindrical surface "$a$," as shown in FIGURE 3, is provided on each of the inner ball seat portions 44 and 46 for purposes to be subsequently explained. Also, included as part of the coupling 38 is a bolt 48 extending through the washer-like elements 40 and 42 and a torque nut 50 which threadedly engages the end of the bolt. Thus, it will be seen that the washer-like elements are confined between the torque nut 50 and bolt head 52. Located between the washer-like elements 40 and 42 and adjacent the inner ball seats is an oil or grease soaked spacer 54 formed of absorbent material, such as felt, which insures proper lubrication of the joint at all times.

In order to lock the balls 30, 32, 34 and 36 within their respective bores 22, 24, 26 and 28, balls having a diameter slightly greater than the diameters of the bores are utilized. Thus, if the bores are of .296/.289 diameter, a .312 diameter steel ball would be suitable for pressing into the bore. A light force ($F_1$) acting against a die block 56, as shown in FIGURE 6, is used to insert the ball into the bore. The equator "$b$" of the ball must be pressed past the inner end of the bore a suitable amount, such as approximately .015″ to .020″. After the ball has been press-fit into the bore to the desired depth, the metal 58, which has expanded around the ball because of the high interference fit, is coined back to the surface of the ball by applying a heavy force ($F_2$), as shown in FIGURE 7. Through such a coining operation, the ball is firmly locked to the arm of the forked member and no relative movement will occur therebetween. It will be understood that other suitable methods of firmly locking the ball in place may also be utilized. For example, the ball may be inserted into the bore from the outside of the forked arm, as shown in FIGURE 10, and the ball may be staked in place from the outside, as shown at 60, or welded in place in order to prevent relative movement of the ball with respect to the arm during normal universal joint operation. If the ball is not properly locked within the bore, it has been found that it has a tendency to work inwardly under certain universal joint operating conditions.

An important aspect of this invention is the utilization of cylindrical surfaces "$a$" in each portion 44 and 46 of the inner ball seats, as shown in FIGURE 3. These cylindrical surfaces have a radius "$c$" which is substantially equal to radius "$d$" of the balls. Through such an arrangement, it is possible to maintain line contact at all times with the contacting ball and thereby eliminate backlash in any direction of movement. In order to obtain maximum torsional rigidity and/or stiffness in a universal joint of this type which utilizes cylindrical surfaces for line contact with the balls, it has been found that this can be accomplished by forming each portion of the inner ball seats with two spherical surfaces "$e$" extending from the cylindrical surface "$a$" each of which has a radius "$f$" which also is substantially equal to the radius "$d$" of the balls. It will be understood that line contact between the ball and seat could also be achieved by broaching each seat portion 44 and 46 to form a cylindrical surface "$a$" extending the whole length thereof, as shown in FIGURE 8. However, such a seat configuration is not desirable for most applications because the additional loss of metal will result in a weaker torque transmitting washer.

With this novel arrangement of parts, it will be seen that it is possible to achieve and control any desired preload level simply by adjusting, that is, by rotating the nut 50 within a given torque range. Thus, if the nut 50 is tightened, washer-like elements 40 and 42 will be caused to move towards each other. Such movement of the elements 40 and 42 will, by virtue of the cylindrical surface "a" on each of the inner ball seat portions 44 and 46, cause the arms 12, 14, 18 and 20, which in effect are cantilever beams, to become preloaded. This cantilever beam action of the universal joint arms will compensate for lash or wear over extended periods of operation and through use of subsequent adjustments, if necessary, maintain a lash-free universal joint at all times regardless of operation, reverse direction, etc.

It will also be noted from FIGURE 4, that the utilization of a square-shaped washer element 40 as a torque transmitting element, provides a safety backup for high static torque loadings. Thus, under such high loadings, the square washer will contact the inside of the arms at points 70 to limit loading of the balls and twisting of the arms.

The advantages and many applications of a universal joint which has the foregoing described features will be obvious to those skilled in the art. Furthermore, although this invention has been described in connection with certain specific embodiments, it will be obvious to those skilled in the art that various changes may be made in the form, structure and arrangement of parts without departing from the spirit of the invention.

Accordingly, I do not desire to be limited to the specific embodiments disclosed herein primarily for purposes of illustration, but instead desire protection falling within the scope of the appended claims.

Having thus described the various features of the invention, what I claim as new and desire to secure by Letters Patent is:

1. A universal joint comprising two members capable of being rotated with their axes angularly disposed with respect to one another, a pair of spaced arms located at the end of each of said rotatable members, diametrically opposed spherical surfaces fixedly connected to and protruding from the arms of each of said rotatable members, said spherical surfaces of one of said members being centered in the same plane with the spherical surfaces of the other of said members but at right angles with respect thereto, and adjustable coupling means for joining said rotatable members, said coupling means including torque transmitting center retaining means having inner seats for receiving said spherical surfaces, said inner seats including cylindrical surfaces having a radius substantially equal to that of said spherical surfaces for maintaining virtual line contact at all times with said spherical surfaces to eliminate backlash in any direction of movement, and means operatively connected to said torque transmitting center retaining means for causing movement thereof in a direction tending to preload said arms by moving said arms in an outward direction.

2. A universal joint comprising two members capable of being rotated with their axes angularly disposed with respect to one another, a pair of spaced arms located at the end of each of said rotatable members, diametrically opposed bores located in the arms of each of said rotatable members, said bores of one of said members being centered in the same plane with the bores of the other of said members but at right angles with respect thereto, a ball press-fit into and locked within each of said bores so that the equator of said ball is located within its associated bore, said ball having a portion thereof protruding from the arm in which it is located, said associated bore of each arm having a diameter at its inner end which is less than the diameter of the ball therein, and adjustable coupling means for joining said rotatable members, said coupling means including torque transmitting center retaining means having inner ball seats for receiving said balls, and means operatively connected to said torque transmitting center retaining means for causing movement thereof in a direction tending to preload said arms by moving said arms in an outward direction.

3. A universal joint, as defined in claim 2, wherein said balls are pressed into said bores from the inner ends of said bores and said inner ends are coined around the surface of said balls to prevent relative movement between the balls and said arms.

4. A universal joint, as defined in claim 2, wherein said balls are pressed into said bores from the outer ends of said bores and said outer ends are staked around the surface of said balls to prevent relative movement between the balls and said arms.

5. A universal joint comprising two members capable of being rotated with their axes angularly disposed with respect to one another, a pair of spaced arms located at the end of each of said rotatable members, diametrically opposed bores located in the arms of each of said rotatable members, said bores of one of said members being centered in the same plane with the bores of the other of said members but at right angles with respect thereto, a ball press-fit into and locked within each of said bores, said ball having a portion protruding from each of said arms, and adjustable coupling means for joining said rotatable members, said coupling means including torque transmitting center retaining means having inner ball seats for receiving said balls, and means operatively connected to said torque transmitting center retaining means for causing movement thereof in a direction tending to preload said arms by moving said arms in an outward direction, said torque transmitting center retaining means comprising a pair of axially aligned square-shaped washer-like elements for contacting the inside of said arms to limit loading of the balls and twisting of said arms, each of said elements having a portion of said inner ball seats formed on the adjacent edges thereof, said axially aligned washer-like elements being caused to move towards each other by the means operatively connected thereto.

6. A universal joint, as defined in claim 5 wherein the means operatively connected to said washer-like elements for causing movement thereof towards each other comprises a bolt extending through said washer-like elements and a torque nut threadedly engaging the end of said bolt for confining the washer-like elements between the bolt head and nut and for causing movement of said washer-like elements towards each other upon rotation of said nut.

7. A universal joint, as defined in claim 5, wherein a lubricant soaked absorbent material is located between said washer-like element.

8. A universal joint, as defined in claim 5, wherein each portion of said inner ball seats contains a cylindrical surface therein, said cylindrical surface having a radius substantially equal to that of said balls for maintaining virtual line contact at all times with said balls to eliminate backlash in any direction of movement.

9. A universal joint, as defined in claim 8, wherein each portion of said inner ball seats also contains two spherical surfaces extending from said cylindrical surface, each of which has a radius substantially equal to that of said cylindrical surface.

10. A universal joint, comprising two members capable of being rotated with their axes angularly disposed with respect to one another, a pair of spaced arms located at the end of each of said rotatable members, diametrically opposed bores located in the arms of each of said rotatable members, said bores of one of said members being centered in the same plane with the bores of the other of said members but at right angles with respect thereto, a spherical ball press-fit into and locked within each of said bores, said balls each having the equators thereof located within said bores and spaced from the inner end thereof so that less than one-half of each of the balls protrudes from said arms, and adjustable coupling means for joining said rotatable members, said coupling means including a pair of axially aligned torque transmitting washer-like elements having inner ball seat portions formed on the adjacent edges thereof for receiving said balls, said ball seat portions each containing a cylindrical surface therein having a radius equal to that of said balls for maintaining line contact at all times with said balls to eliminate backlash in any direction of movement, a bolt extending through said washer-like elements, and a nut threadedly engaging the end of said bolt for confining the washer-like elements between the bolt head and nut and for causing movement of said washer-like elements towards each other to preload said arms.

References Cited by the Examiner
UNITED STATES PATENTS

| | | | |
|---|---|---|---|
| 1,358,221 | 11/1920 | Leppert | 64—17 |
| 2,783,626 | 3/1957 | Klomp | 64—17 |
| 2,879,651 | 3/1959 | Leto et al. | 64—17 |
| 3,107,506 | 10/1963 | Klomp | 64—17 |
| 3,217,516 | 11/1965 | Runkle | 64—17 |

FRED C. MATTERN, JR., *Primary Examiner.*

HALL C. COE, *Examiner.*